US 7,422,613 B2

(12) United States Patent
Böckle et al.

(10) Patent No.: US 7,422,613 B2
(45) Date of Patent: Sep. 9, 2008

(54) FILTER CONFIGURATION FOR A VAPOR EXTRACTION HOOD

(75) Inventors: Martin Böckle, Bretten (DE); Achim Dittes, Zaisenhausen (DE); Egon Feisthammel, Rastatt (DE); Ralf Grobleben, Bretten (DE); Martin Kornberger, Bielefeld (DE); Udo Reiff, Knittlingen (DE); Dieter Rosmann, Stuttgart (DE); Dietrich Schmid, Ehningen (DE)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 87 days.

(21) Appl. No.: 10/928,304

(22) Filed: Aug. 27, 2004

(65) Prior Publication Data
US 2005/0022482 A1 Feb. 3, 2005

Related U.S. Application Data

(63) Continuation of application No. PCT/EP03/01343, filed on Feb. 11, 2003.

(30) Foreign Application Priority Data
Feb. 27, 2002 (DE) .............................. 102 08 474.2

(51) Int. Cl.
*B01D 50/00* (2006.01)

(52) U.S. Cl. .............................. 55/318; 55/443; 55/466; 55/511; 55/DIG. 36

(58) Field of Classification Search ................... 55/428, 55/443, 444, 466, 511, DIG. 36, 318
See application file for complete search history.

(56) References Cited

U.S. PATENT DOCUMENTS

| | | | | | |
|---|---|---|---|---|---|
| 3,425,334 | A | * | 2/1969 | Brown | ..................... 126/299 D |
| 3,854,912 | A | * | 12/1974 | Terrel et al. | .................... 96/134 |
| 3,910,782 | A | | 10/1975 | Struble et al. | |
| 5,318,609 | A | | 6/1994 | Kittler | |

FOREIGN PATENT DOCUMENTS

| | | |
|---|---|---|
| DE | 27 20 201 A1 | 11/1978 |
| DE | 41 31 988 A1 | 4/1993 |
| DE | 41 38 846 A1 | 5/1993 |
| DE | 197 53 687 A1 | 6/1999 |
| SU | 1487947 | 6/1989 |
| SU | 1632468 | 3/1991 |

* cited by examiner

*Primary Examiner*—Robert A. Hopkins
(74) *Attorney, Agent, or Firm*—Russell W. Warnock; James E. Howard

(57) ABSTRACT

A filter system extracts particles and/or drops of liquid from air flowing through the filter system. The filter system has a filter layer disposed in a plane and a cyclone collector that is disposed in the edge region of the filter layer. The cyclone collector is provided with a device which, compared with the filter layer, creates a higher flow speed and stronger vortexing of the circulating air. The cyclone collector can be produced from horizontal cyclone elements, curved, horizontal elements or from expanded metal.

86 Claims, 11 Drawing Sheets

FILTER CONFIGURATION FOR A VAPOR EXTRACTION HOOD

CROSS-REFERENCE TO RELATED APPLICATION

This application is a continuation, under 35 U.S.C. § 120, of copending international application No. PCT/EP03/01343, filed Feb. 11, 2003, which designated the United States; this application also claims the priority, under 35 U.S.C. § 119, of German patent application No. 102 08 474.2, filed Feb. 27, 2002; the prior applications are herewith incorporated by reference in their entirety.

BACKGROUND OF THE INVENTION

Field of the Invention

The invention relates to a filter configuration for vapor extraction hoods for the separation of particles and/or liquid droplets, which are used, in particular, in kitchens above a cooking are.

Filter configurations of this type are known. German Patent DE 27 20 201 C2 and U.S. Pat. No. 3,910,782 describe filters which are formed of a first row of profiles disposed at distances from one another and open in the direction of the gas flow and of a second row of profiles disposed at distances from one another and open opposite to the direction of the gas flow. The mutually adjacent longitudinal edges of two profiles of one row that lie next to one another projecting in each case into the inner space of an opposite profile of the other row.

In these separation grids, the distance between the two profile rows is dimensioned such that the air flowing through experiences a multiple reversal of direction. The free passage cross section amounts to 30% of the total grid area, depending on the separation grid—type 10. An increase in the air velocity of 3-10 times occurs within the separation grid due to the reduction in cross section. The separating action of the grid is based on this velocity increase, as a result of which the liquid droplets and solid particles contained in the air are of course also accelerated, and on the multiple reversal of direction of the air flowing through. The accelerated liquid droplets and solid particles cannot follow the direction change and impinge on to the inner surface of the profiles of the second row. On the surface of these, the liquid droplets form a liquid film that gradually runs off downward and passes through special orifices in the frame of the separation grid into a collecting rail disposed under the separation grid.

German Utility Model DE 298 11 000 Ul proposes a grease trap filter which makes use of two or more layers of a grid which are formed of slotted bridges produced on both sides of a metal sheet by a stamping operation, the grids being disposed within the filter in such a way that the slotted bridges run vertically or obliquely downward and the grids are held together by a common frame. A further grid, the slotted bridges of which are disposed horizontally, may be located in each case between two grids having slotted bridges running vertically or obliquely downward.

Furthermore, grease filters formed of multilayer expanded metal are known. Thus, Published, Non-Prosecuted German Patent Application DE 197 53 687 A1 describes a multilayer conically configured expanded-metal filter which has on the outside an integrally formed planar circular disk ring for good bearing against the filter frame.

An essential disadvantage of these plate-shaped or conically configured grease filters, in which the air, usually sucked in by a blower, flows through the plate plane, is the reduced edge suction extraction.

In order to eliminate this disadvantage, it has already been proposed in Published, Non-Prosecuted German Patent Application DE 41 38 846 A1, in a filter cartridge, via the filter surface of which the air to be filtered is sucked in, to divide the filter surface into subregions through which air flows and which inhibit the through flow. In this case, for the purpose of improved edge suction extraction, there is provision for the subregions which inhibit the through flow, to increase toward the center of the filter surface. This has the disadvantage, of course, that the overall filter surface is restricted in favor of flow optimization.

Furthermore, transverse-through flow plate-shaped separators for separating liquids from a gas stream, in particular an oil mist, are known from the industrial sector, and in these vortex elements, what are known as X-shaped vortex elements, are used, which bring about a deflection of the gas stream and consequently liquid separation (see German Patent DE 41 31 988 C2). Transverse-through flow plate-shaped separators of this type are not suitable for use in commercial kitchens or in domestic vapor extraction hoods.

SUMMARY OF THE INVENTION

It is accordingly an object of the invention to provide a filter configuration for a vapor extraction hood which overcomes the above-mentioned disadvantages of the prior art devices of this general type, in which air flows through a filter plane and which has improved edge suction extraction.

With the foregoing and other objects in view there is provided, in accordance with the invention, a filter configuration for a vapor extraction hood for separating particles and/or liquid droplets from air flowing through the filter configuration. The filter configuration contains at least one filter ply disposed in one plane and an edge filter disposed in at least one edge region of the filter ply. The edge filter is formed as a vortex separator.

According to the invention, the filter configuration is provided for the separation of particles and/or liquid droplets from the air flowing through the filter configuration. The filter configuration has at least one filter ply disposed in one plane and of an edge filter which is disposed in the edge region of the filter ply. The edge filter is preferably provided with a device that, in comparison with the filter ply, brings about an increased flow velocity and more pronounced swirling.

As is known from the prior art, the filter ply may be formed of one or more layers of an expanded metal and/or a nonwoven material and/or paper, the edge filter being constructed as a swirling stream filter, as a baffle filter and/or as an expanded-metal, nonwoven or paper filter.

By this configuration of a vortex separator, through which the flow passes transversely, markedly improved edge suction extraction can be achieved. It is advantageous, in this case, if the flow resistance of the edge filter is lower than the flow resistance of the filter ply, since fumes in the edge region of the filter configuration are thereby prevented from leaving the edge region. Moreover, the higher flow velocities resulting from the lower flow resistance intensifies the swirling. As a result, the particles or liquid droplets are separated more effectively in the edge filter, particularly when the edge filter is configured as a vortex filter or as a baffle filter.

The edge filter, configured as a vortex separator, has at least one, preferably two rows of devices, disposed one behind the other, for the formation of vortices in the air flowing through the vortex separator. Since, for example, a vapor extraction hood has a peripheral edge, it is advantageous if the entire edge also receives peripheral edge suction extraction, in order to prevent fumes from leaving the suction region of the vapor extraction hood. It is therefore advantageous if edge filters are disposed peripherally in the edge region of the filter ply.

Furthermore, one refinement of the invention provides for the edge filter to be disposed on the edge region preferably perpendicularly to the plane of the filter ply, in such a way that liquid droplets separated in the edge filter flow into the edge region of the filter ply and are absorbed there.

If the filter ply, that has one or more layers of expanded metal and/or nonwoven material and/or paper, is bordered by a U-shaped frame, a further advantageous refinement of the invention provides for the upper frame leg to be of a prolonged configuration, in order to receive the edge filter. So that liquid droplets separated in the edge filter can be diverted here, too, in a preferred version the frame has orifices in the region of the edge filter disposed on it.

What has proved appropriate as an edge filter is a vortex separator that possesses a row of X-shaped vortex elements, preferably two rows of X-shaped vortex elements disposed one behind the other. In the case of two rows of X-shaped vortex elements disposed one behind the other, their curved legs engage one into the other so as to maintain an air gap. When the flow passes transversely through the X-shaped vortex elements thus disposed, vortices are formed, so that the particles and/or liquid droplets contained in the air are thrown against the walls of the legs and are separated.

In a further advantageous version, there is provision for the filter ply, together with the edge filter, or the filter ply, together with the vortex separator and the frame, to form the cartridge filter.

The filter configuration per se and, in particular, in the construction as a cartridge can preferably be used in the suction-extraction orifice of a vapor extraction hood or chimney which has an air conveying device for the suction-extraction of air via the suction-extraction orifice. Furthermore, the cartridge may be disposed exchangeably and is therefore additionally service-friendly.

Moreover, the filter configuration affords the possibility of arranging on the edge filter a screen which extends radially outward beyond the edge of the filter configuration, in order to guide fumes and vapors toward the filter configuration, in particular toward the edge filter.

In another exemplary embodiment of the vortex separator configured as an edge filter, horizontal curved elements are used, the elements being placed at the edge of the filter configuration in such a way that the inflowing air first impinges on to a streamlined shape. When the air runs further on through the vortex separator, it is deflected at least by a further curved element.

In a first refinement of the curved element, this has a C-shaped configuration. The convex "back" of the C-shape is assigned to the filter edge. Free legs of a further C-shaped curved element engage into the concave "orifice" of the C-shape. A sharp deflection of the air stream thereby takes place, with the result that grease or water droplets are precipitated on the surface of the water separator.

Further configurations of the curved element are V-shaped, S-shaped, drop-shaped or dumbbell-shaped. These are dealt with in more detail within the scope of the description. According to the invention, the vortex separator may also be formed of a combination of at least two different shapes.

When a multiplicity of curved elements have to be mounted, it is disadvantageous if these elements have to be mounted individually. It is therefore advantageous if the curved elements are disposed on a common base plate. This base plate may be located both above and below the curved elements. It is advantageous, however, if the base plates are disposed at the bottom, because residues of the grease or water condensate running off from the curved elements lie on the base plate which is then delivered in one piece with the curved elements to a cleaning process, for example in a dishwasher.

It is also advantageous if the base plate extends along the edge of the filter ply. By virtue of this configuration, the condensate and grease separated by the edge filter can run off via the base plate and be sucked up or bound by the filter ply. It is advantageous, in this case, if the base plate is inclined toward the filter ply. If the base plate is not inclined, the condensate does not necessarily run from the edge of the filter configuration, because the air stream constantly sucks the condensate toward the center of the filter.

The curved elements are not only limited on one side by the base plate, but are assigned a further plate on the other side. These two plates together form a duct. It is advantageous if, as seen in the flow direction, the two plates form a widening gap, because these plates then produce a nozzle. This nozzle shape intensifies the condensation of grease and water.

It is advantageous if the vortex separator, together with the curved elements, is produced by injection molding. This entails low costs in terms of mass production despite the complex configuration of the vortex separator. Production from plastic is particularly cost-effective. However, a vortex separator produced from light metal by injection molding is also suitable for mass production. Moreover, it is more resistant to cleaning that, if appropriate, is aggressive, than a vortex separator made from plastic. Aluminum has proved particularly suitable as material for the production of a vortex separator from light metal.

If an edge filter is disposed at least on one longitudinal side of a filter ply, the edge filter may also at the same time replace this part of the filter ply frame. This avoids the need for a material for this frame part.

In another refinement of the vortex separator, the latter is part of a vapor extraction hood. Owing to this structural proximity to the vapor extraction hood, a multiplicity of functions can be organized more conveniently. This is dealt with again in the further part of the description.

As already stated, the edge filter, preferably configured as a vortex separator, is located in the edge region of the filter configuration. As also already mentioned, it is important that precisely the edge region of a filter configuration is subjected to an effective suction, so that stray vapor fumes could not leave its effective range. It is therefore advantageous if the edge filter has a downwardly directed inflow orifice.

An edge filter that, when exposed, faces the vapor fumes, may possibly impede handling during cooking. It is therefore advantageous if the edge filter has a swing-out configuration, so that it is extended only as required. It is advantageous, furthermore, if the edge filter is configured to be capable of being connected and disconnected, because, if fumes occur to only a slight extent, suction through the middle filter ply may possibly be sufficient. Energy costs can thereby be saved. This connectability and disconnectability may take place manually in a simple way. It is also possible, however, that it is implemented automatically. The automatic mechanism necessary for this purpose is controlled by a sensor that may be configured as a pressure sensor.

Since the edge filter may be severely polluted, it is advantageous if it is easily demountable. This may take place, for example, by a simple plugging or latching connection.

In addition to the embodiments of the vortex separator configured as an edge filter, an X-shaped vortex element or horizontal curved elements, there is, according to the invention, also an edge filter formed of expanded metal. Expanded metal is known in many different embodiments, also from the field of kitchen filters. However, so that a vortex separator formed of expanded metal fulfills the condition of low flow resistance for the edge region of the filter ply, the expanded metal must be configured to be markedly more air-permeable here than a filter ply. What is important in this refinement is that the condensate can pass from the expanded metal toward the filter ply. For this reason, in a vortex separator formed of expanded metal, the surface of the expanded metal is inclined toward the filter ply.

In a refinement of the invention, the expanded metal of the edge filter and the expanded metal of the filter ply are produced in one piece. In order to ensure the air permeability of the edge filter, the expanded metal in the region of the edge filter is formed, if appropriate, of only a single ply of expanded metal.

However, the expanded metal for the edge filter may also be a separate component. This has the advantage that the edge filter is a less bulky component and is therefore easier to handle during cleaning.

Although, in the case of an edge filter formed of expanded metal, there is no need for any notable shapes, as, for example, with the curved elements, it is nevertheless advantageous if the edge filter is surrounded by a component produced by injection molding. This advantage becomes apparent when, for example, the elongate "housing" of an edge filter is produced from an extruded material, the cross section of the material thus being constant over its entire length. If, for example, a local material variance is required, as seen over the length of the material, it is not possible with an extruded material. However, for example, a bore or a nozzle bead can be produced by injection molding.

Extruded profiles that border an edge filter in the longitudinal direction can be held in their desired position in a simple way by flaps attached on the end faces. For this purpose, the flaps have corresponding recesses on the side facing the extruded profiles.

Occasionally, it may happen that the edge filter preferably produced from expanded metal loses condensate drops before they have reached the filter ply. It is then advantageous, here, if the inflow orifice for the fumes is provided with an inner edge on the underside of the edge suction. As a result, the drops cannot flow back through the inflow orifice. This edging additionally has the advantage that the inflow orifice thereby becomes a nozzle that assists the condensation of the fumes.

The effect of the more intensive edge suction may also be reinforced by arranging next to one another at least two filter plies, each with at least one edge suction. This results in alternating fields of strong and of moderated suction.

In regions where there is a pronounced occurrence of fumes, for example in large kitchens or in otherwise intensive kitchen utilization, it may be advantageous if a collecting gutter is provided in the vapor extraction hood on account of the increased condensate formation. The collected condensate then either can evaporate again in the case of a lower occurrence of condensate or is discharged by an emptying facility.

Other features which are considered as characteristic for the invention are set forth in the appended claims.

Although the invention is illustrated and described herein as embodied in a filter configuration for a vapor extraction hood, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
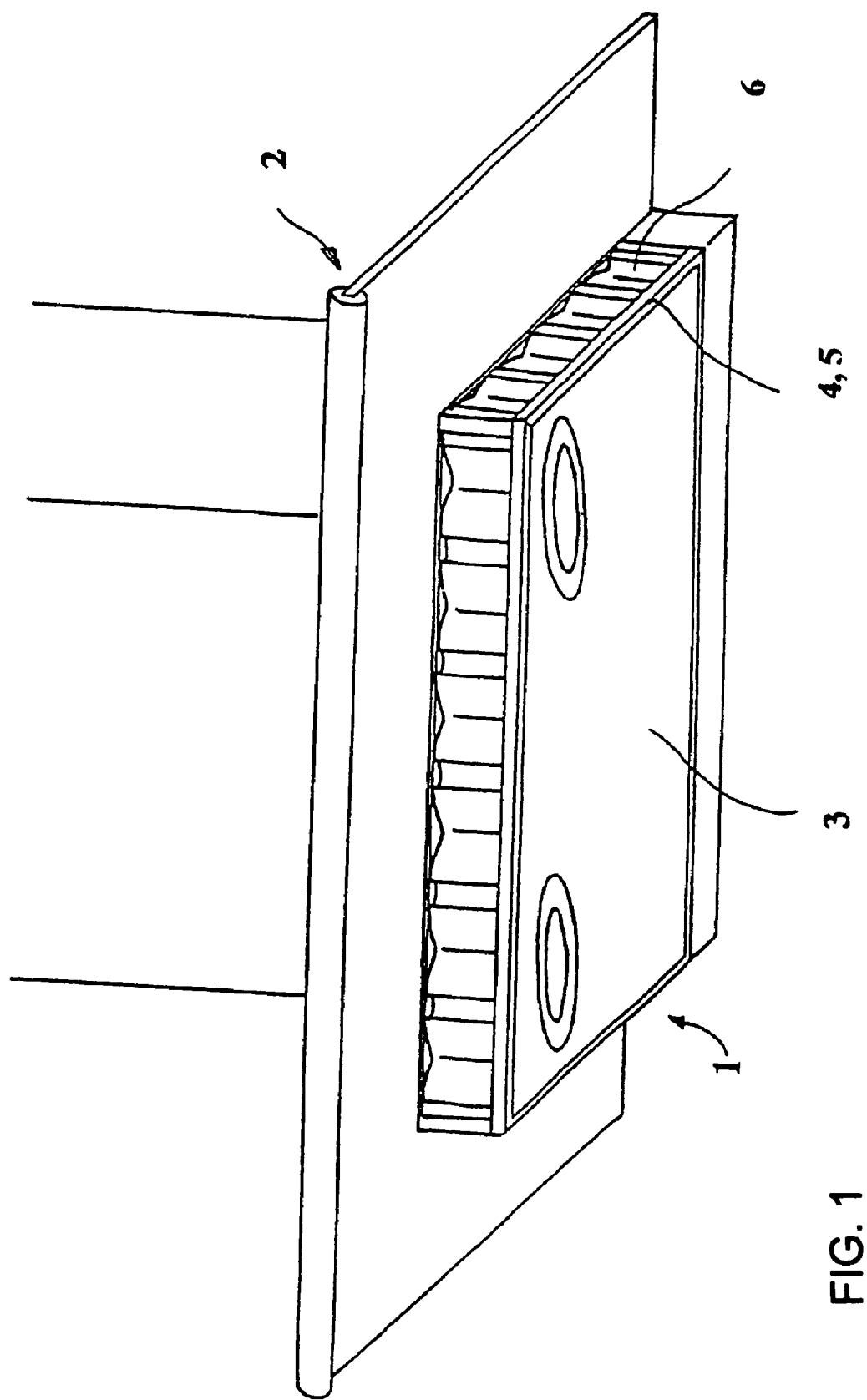
FIG. 1 is a diagrammatic, perspective view of a filter configuration which has been configured as a cartridge filter.

Referring now to the figures of the drawing in detail and first, particularly, to FIG. 1 thereof, there is shown a filter configuration 1 for separating particles and/or liquid droplets from air flowing through the filter configuration 1. The filter configuration 1 contains at least one filter ply 3 disposed in one plane and with an edge filter 6 which is configured as a vortex separator 6 and which is disposed peripherally in an edge region 4 of the filter ply 3. The filter configuration 1 is configured here as a cartridge filter. The filter ply 3 is bordered by a U-shaped frame 5, on which the vortex separator 6 is disposed. The filter configuration 1 is located underneath a vapor extraction hood 2.

The filter configuration 1 is configured in such a way that the flow resistance of the vortex separator 6 configured as an edge filter 6 is lower than the flow resistance of the filter ply 3, with the result that good edge suction extraction is achieved.

This is additionally assisted by a screen which is disposed on the vortex separator 6 and which extends radially outward beyond the edge of the filter configuration 1 and guides fumes and vapors toward the filter configuration 1, in particular toward the vortex separator 6.

Figure 2:
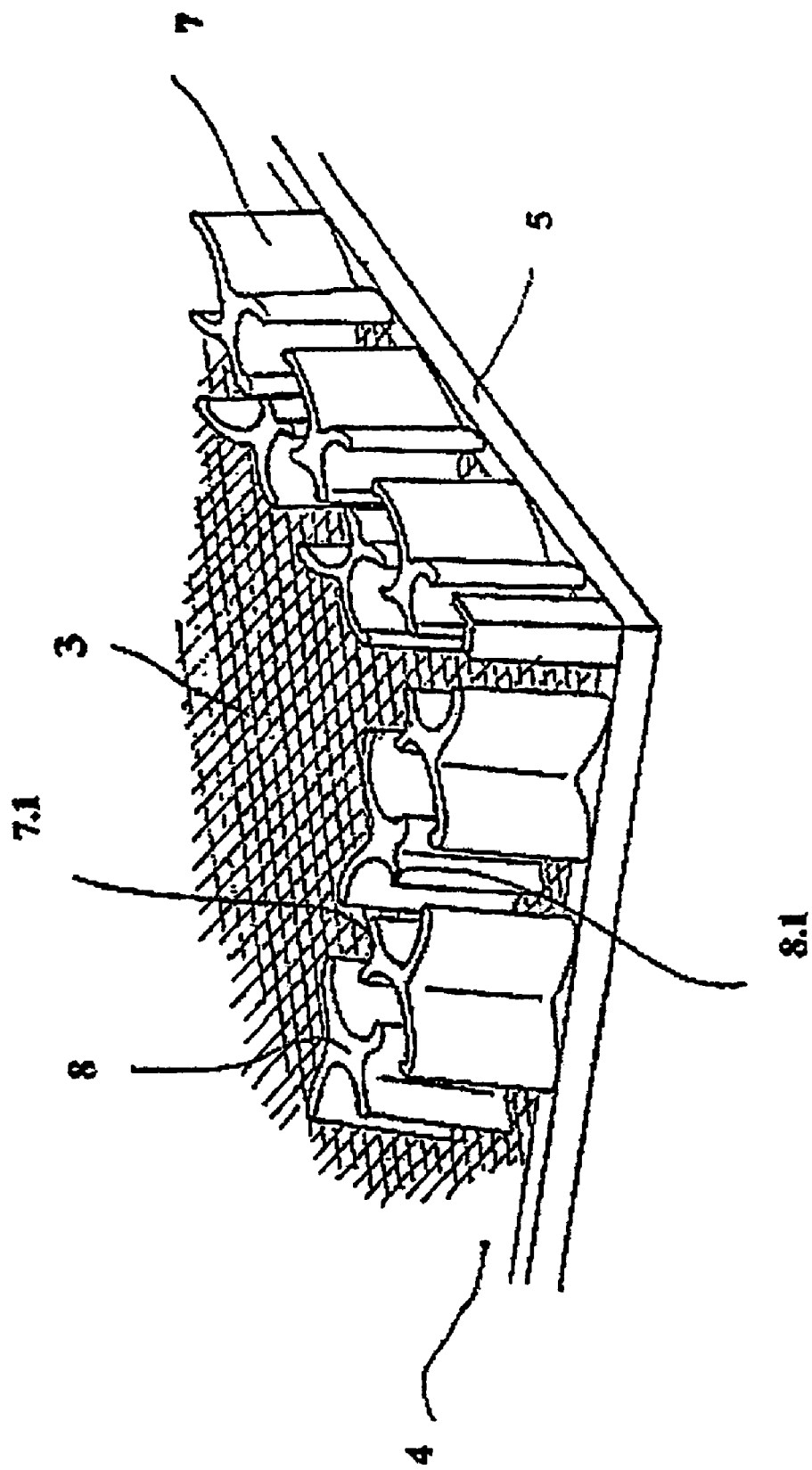
FIG. 2 is a perspective view of a configuration of an edge filter in the form of a vortex separator.

FIG. 2 shows that the vortex separator 6 is formed of two rows of X-shaped vortex elements 7, 8 which are disposed one behind the other, the inner legs 7.1, 8.1 of the two rows of X-shaped vortex elements 7, 8 engaging one in the other so as to maintain an air gap, so that the sucked-in air passes transversely through the X-shaped vortex elements. In this case, vortices are formed, so that the particles and/or liquid droplets contained in the air are thrown against a wall of the legs 7.1, 8.1 and are consequently separated.

The rows of X-shaped vortex elements 7, 8 which form the vortex separator 6 are disposed on the edge region 4 and perpendicularly to the plane of the filter ply 3, in such a way that separated liquid droplets flow into the edge region 4 of the filter ply 3 and can be absorbed there.

In the version illustrated in FIG. 2, the filter ply 3 is bordered by the U-shaped frame 5. The X-shaped vortex elements 7 are disposed in such a way that their outer legs are flush with the front cant of the frame. However, condensate may also be precipitated on those outer faces of the X-shaped vortex elements 7 that point toward the edge of the filter configuration 1. So that the condensate does not drip off over the edge of the frame 5, it is advantageous if the frame 5 has run-off elements that transfer the condensate to the filter ply 3.

If the X-shaped vortex elements 7, 8 are merely placed onto the filter ply 3 without fixing, they could slip out of place and the gap between their legs 7.1 and 8.1 would have an undefined geometry. It is therefore advantageous that the frame 5 is adjacent to the X-shaped vortex elements 7, 8 and therefore affords the possibility of connecting the X-shaped vortex elements 7, 8 to the frame 5. This is advantageously carried out by fastening.

Figure 3:
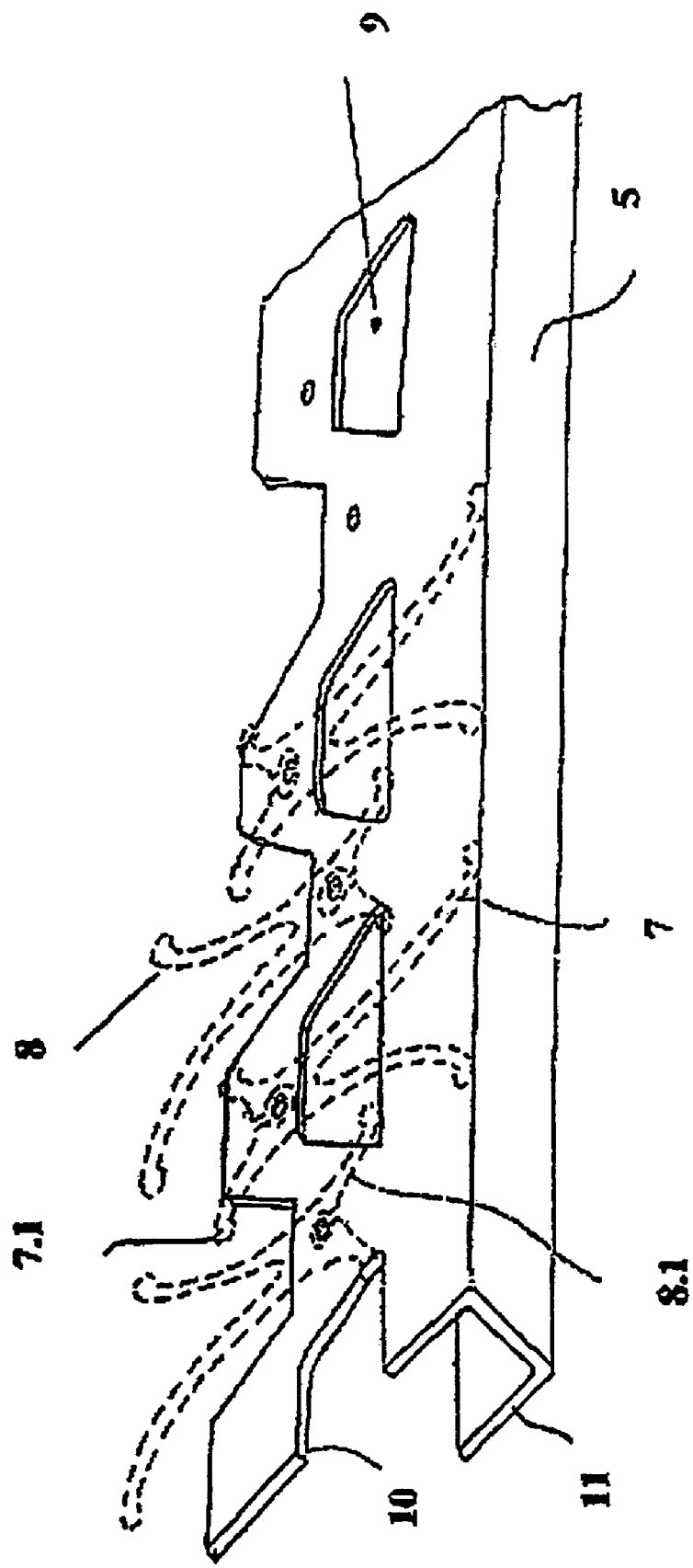
FIG. 3 is a perspective view of a frame with a filter ply and with vortex separators.

FIG. 3 shows a portion of the U-shaped frame 5 with a lower frame leg 11 and an upper frame leg 10. The upper frame leg 10 has a prolonged configuration, in order to receive the X-shaped vortex elements 7, 8. If there is no frame 5, then, with the filter ply 3 having sufficient strength, the X-shaped vortex elements 7, 8 and also the vortex separator 6 may be screwed directly to the filter ply 3.

It is shown, furthermore, that the frame 5 possesses, in the region of the X-shaped vortex elements 7, 8 disposed on it, orifices 9 for diverting the liquid running off from the X-shaped vortex elements 7, 8.

The proposed filter configuration 1 is suitable particularly for the separation of grease and grease droplets or of water and water droplets from the air flowing through the filter configuration 1, but is not restricted to these.

FIGS. 4A to 4E show various shapes of what are known as "horizontal curved" elements 12 in a top view. These elements embody an important component in a form of construction of the vortex separator 6 functioning as an edge filter. When sucked-in air 13 enters a vapor extraction hood 2 in the edge region 4, it impinges onto the outwardly directed streamlined shape (rounded or pointed) of the elements. The flow resistance is therefore low, and the suction extraction of the fuse is impeded only insignificantly thereby. When the air runs further on, it strikes at least one further element 12. Due to the winding path between the elements 12, a sharp deflection of the part air streams occurs. At the walls of the elements, grease or water droplets contained in the air stream are thrown against the wall of the elements 12 and are thereby deposited. The illustrated elements of FIGS. 4A to 4E have in common the fact that always two identically shaped elements 12 (albeit partly with opposite orientation) cooperate in air deflection and separation. This does not necessarily have to be so, but these element shapes selected by way of example show a shape correspondence of this type, so that they form with one another narrow and sharply deflecting ducts.

Figure 4A:
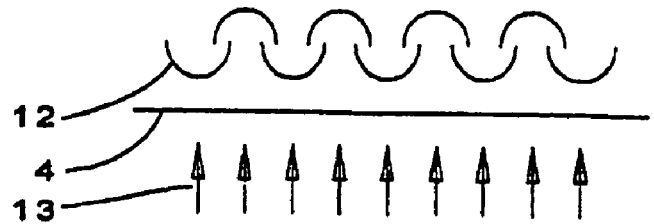
FIGS. 4A-4E are illustrations of various basic shapes of the vortex separator in the form of curved elements.
Figure 4B:
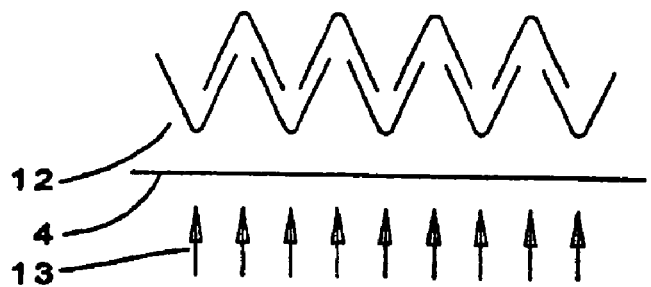
Figure 4C:
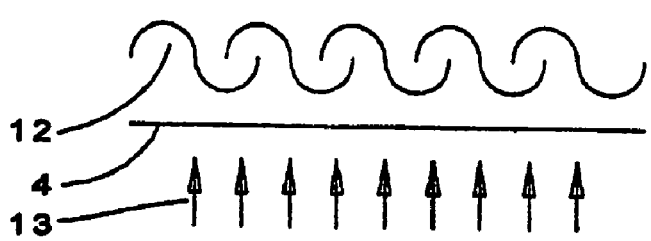
Figure 4D:
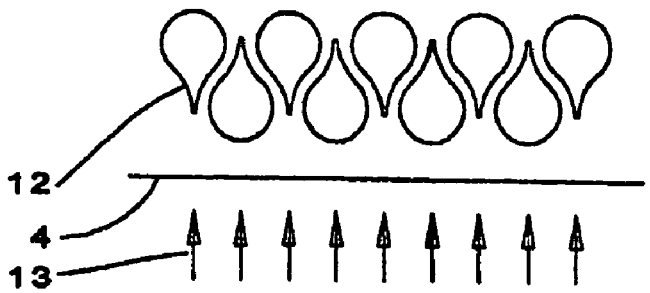
Figure 4E:
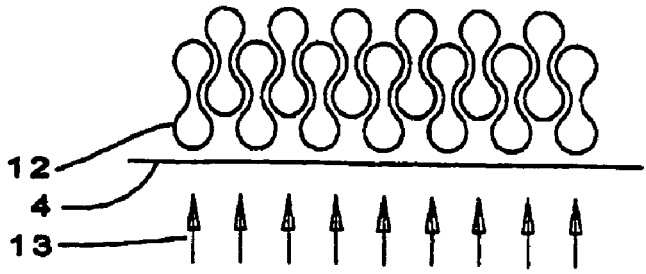

The elements of FIG. 4A may be referred to as C-shaped or else U-shaped. V-shaped elements 12 can be seen in FIG. 4B. In the exemplary embodiment of FIG. 4C, they are S-shaped or wavy elements 12. The elements 12 of FIG. 4D (drop shape) and 4E (dumbbell shape) constitute bulky elements. For reasons of the saving of material, however, these elements may also be configured to be hollow on the inside. There is no risk of the deposition of condensate in these cavities if the cavities are closed by a covering plate which is then at the same time an air guide element.

Figure 5:
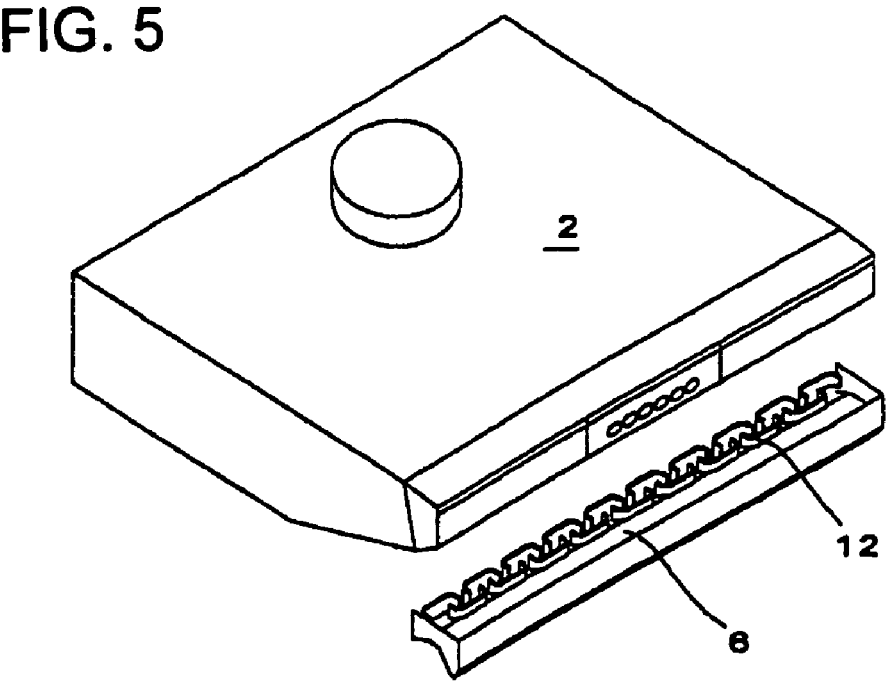
FIG. 5 is a perspective view of a vapor extraction hood with a removed vortex separator having C-shaped elements.

FIG. 5 shows the vapor extraction hood 2 with the vortex separator 6 removed from the front side, the filter ply, not illustrated, and configured as an edge filter. The vortex separator 6 possesses two rows of C-shaped elements 12. In the front row, the "C"s lie with their "backs" outward. The "C-elements" of the inner row engage with their legs into the concave region of the "C-elements" of the front row.

Figure 6:
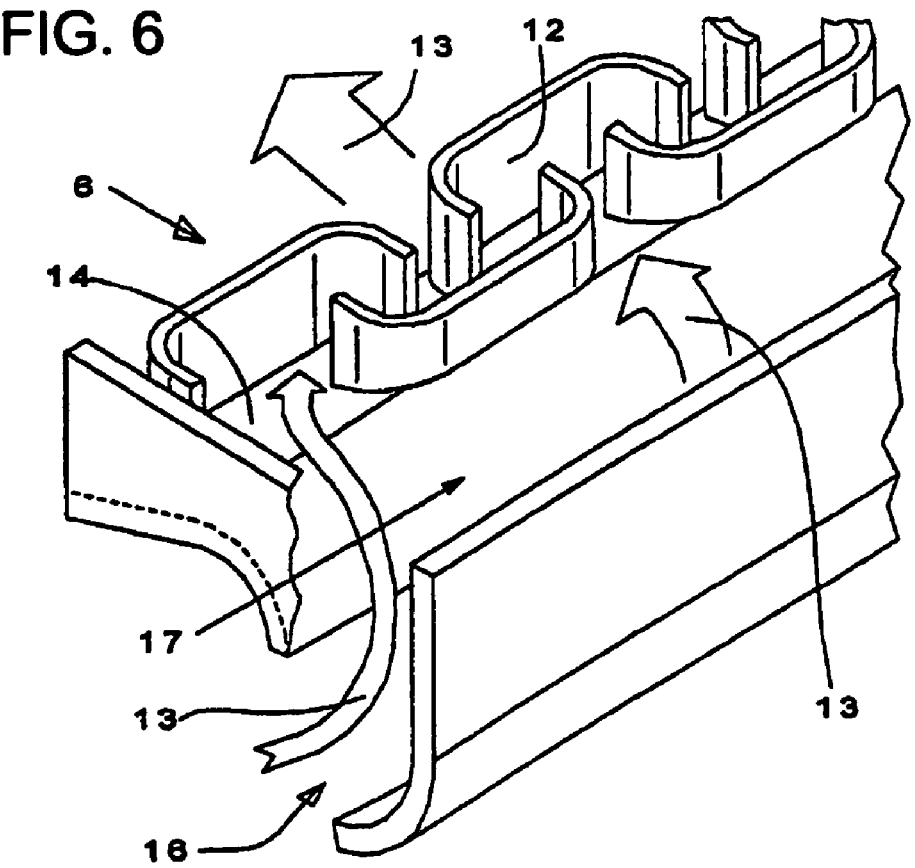
FIG. 6 is a perspective view of a detail of the vortex separator with C-shaped elements.

FIG. 6 shows in detail the vortex separator 6 which serves as the edge filter and which is equipped with the C-shaped elements 12. The sucked-in air passes from below by an inflow orifice 16 into a collecting duct 17. Here, the air stream is then divided into individual part streams that then flow through between the C-shaped elements 12, in order thereafter to be combined again to form an air stream. The C-shaped elements 12 are disposed on a base plate 14. The base plate 14 and the C-shaped elements 12 form a unit that has been produced by injection molding. In the installed state, the vortex separator 6 is covered on its top side.

The edge filter 6 may have a swing-out configuration. It can thus be swung out, as required, and, in the state in which it is not being used, does not disturb the appearance of the appliance.

The edge filter 6 may be provided with a non-illustrated closing device. The edge suction extraction or the edge filter 6 can be connected, as required. This results in two operating states, on the one hand, suction extraction only via the filter ply 3 and, on the other hand, suction extraction via the filter ply 3 and the edge filter 6. The connection and disconnection of the edge filter may be carried out by hand actuation or manually and/or automatically or by motor, preferably via a non-illustrated flap or a non-illustrated slide which may be disposed upstream or downstream of the edge filter.

Automatic connection and disconnection of the edge filter 6 may be controlled by a sensor configuration, preferably as a function of the air quantity to be purified.

The connectability and disconnectability of the edge filter 6 may take place automatically, preferably in that a non-illustrated spring-prestressed flap is provided, which opens and closes automatically as a function of the pressure difference between the outside of the filter configuration (upstream) and the vacuum side of the filter configuration (downstream), preferably as a function of the selected blower stage. A flap of this type may also be designated as a dynamic pressure flap.

Figure 7:
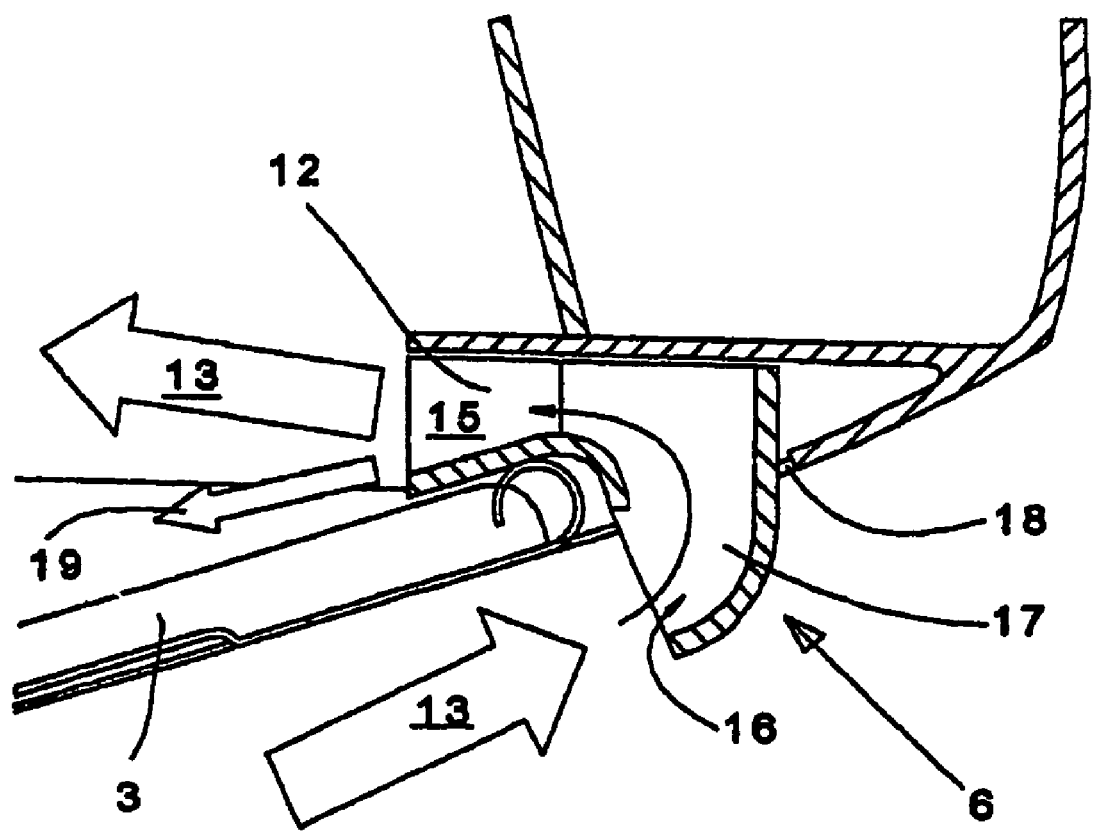
FIG. 7 is a cross-sectional view through an edge filter with an air supply device.

For further addition, then, FIG. 7 shows a cross section through a vortex separator 6 serving as an edge filter and having curved elements 12. The sucked-in air 13 passes via the inflow orifice 16 into the collecting duct 17, where, on account of the large radius of curvature, it is deflected carefully in the direction of the center of the vapor extraction hood. In this case, it flows through the curved elements 12, condensate 19 being separated. The elements 12 have not been shown in section here in the drawing. On account of the inclined base plate 14, the condensate runs onto the surface of the filter ply 3, where it is collected and/or bound. It can be seen clearly in this illustration that the base plate 14, together with a plate, disposed above it, of the vapor extraction hood body, forms a widening nozzle. The vortex separator 6 is held on the vapor extraction hood housing by a latching device 18 (fastening device). When the latching device 18 is released, in this exemplary embodiment the vortex separator 6 can be removed together with the filter ply 3, which is configured here as a cartridge.

Figure 8:
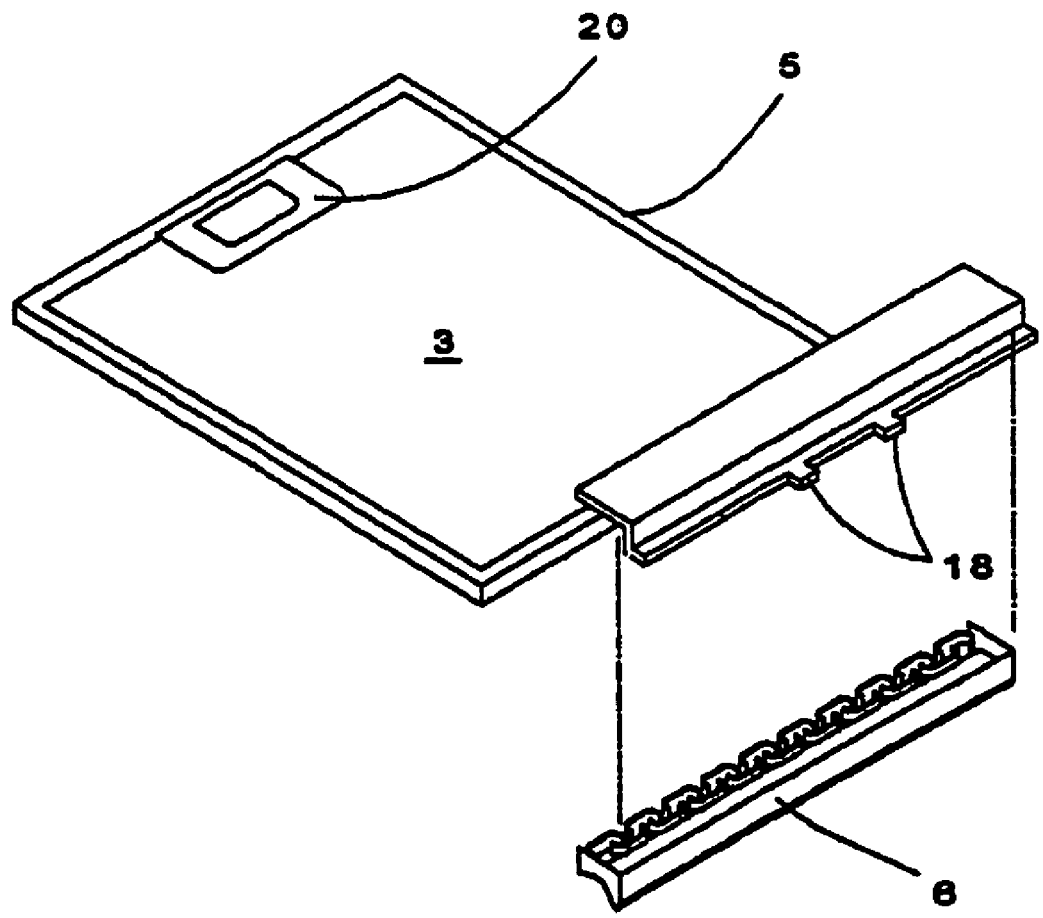
FIG. 8 is a perspective view of a cartridge filter having a vortex separator with C-shaped elements.

FIG. 8 shows, in the demounted state, the filter ply 3 that is configured as a filter cartridge. The vortex separator 6 is disposed at the front cant. Above the vortex separator 6 is located a counter-piece which is braced together with the vortex separator 6 and is thereby fixed to a front part of the frame 5 of the filter cartridge. A grip depression 20 has been placed structurally into the rear region of the filter cartridge, so that it does not disturb the airflow and consequently impair the filter process.

Figure 9:
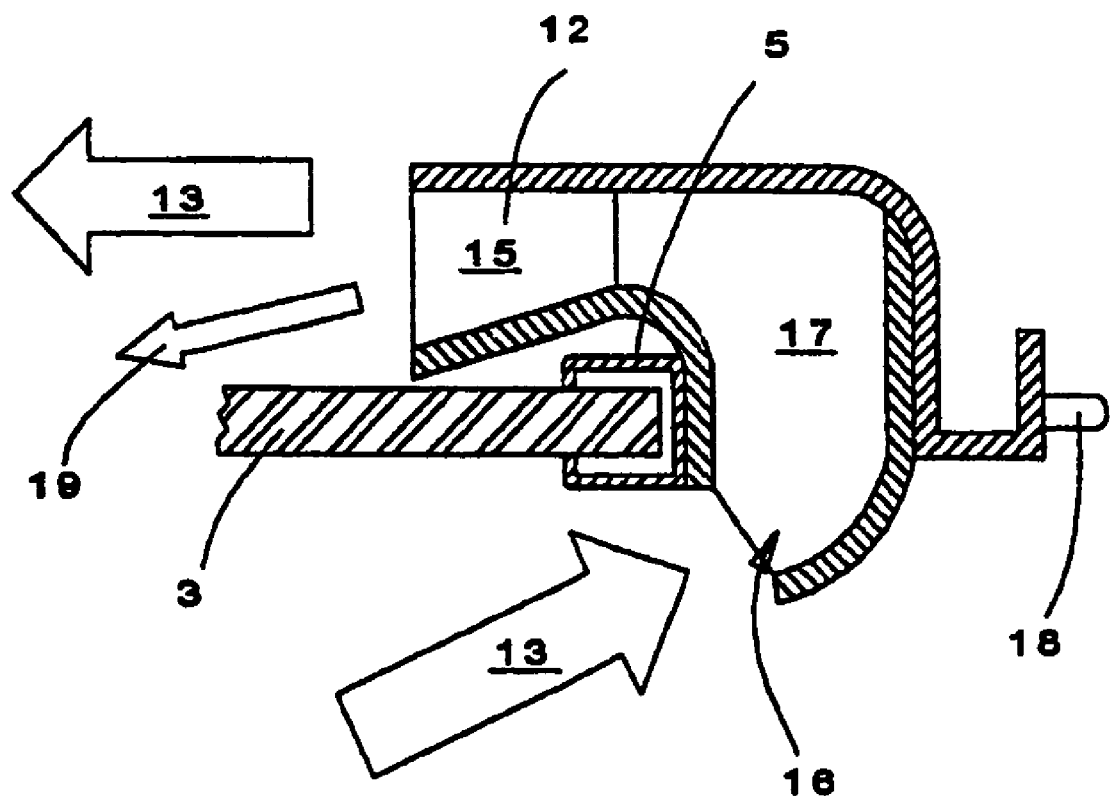
FIG. 9 is a cross-sectional view of the cartridge filter shown in FIG. 8.

FIG. 9 is very similar to FIG. 7, except that, in FIG. 9, the filter ply 3 is configured as a cartridge filter. The frame 5 of the filter cartridge and the vortex separator 6 are braced with one another. The vortex separator 6 has, on its outside on the right, a latching device 18, by which it can be latched to the non-illustrated housing of the vapor extraction hood 2.

FIGS. 10 to 13, then, explain a further structural solution for the edge filter 6. This is an edge filter 6 with at least one expanded-metal ply.

Figure 10:
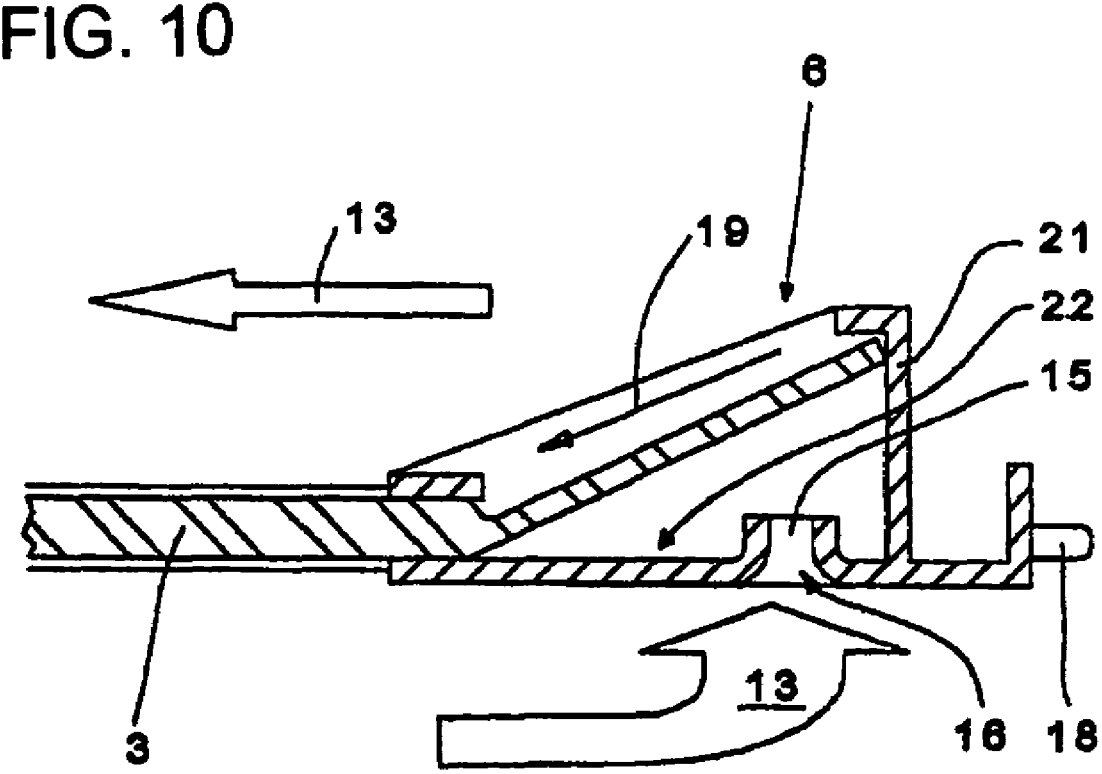
FIG. 10 is a cross-sectional view through an edge filter formed of an expanded metal.

A filter ply 3 with a regular number of plies can be seen on the left in FIG. 10 illustrated in cross section. These plies may be various expanded-metal plies, but may also be combinations with paper and/or nonwoven plies. As the hatching indicates, the filter ply 3 also extends into the region of the edge filter 6. Here, however, the number of plies of the edge filter 6 is reduced, as compared with the filter ply 3, and the ply effective here is manufactured from expanded metal. This reduction in the plies is necessary in order to keep the flow resistance in the region of the edge filter 6 low. On the other hand, however, the engineer must also make sure that there is a sufficient number of expanded-metal grid bars, so that grease and/or water droplets are sufficiently deflected and can be precipitated on the obstacle which an expanded-metal grid bar constitutes. Due to adhesion, the condensate is then initially caught on the expanded metal in the region of the edge filter 6. Owing to the illustrated inclination of the expanded metal, however, the condensate 19 gradually creeps toward the filter ply 3. The condensate is then sucked up and/or bound here.

The edge filter 6 is disposed in a housing 21. The housing 21 is illustrated in one part and as a plastic injection molding in FIG. 10. In the left region, the housing 21 possesses a fork-shaped clamp, by which the edge filter 6 produced from expanded metal is fastened to the filter ply 3. In the right region, the edge filter 6 possesses a latching 18 that is attached through a U-shaped resilient part. The lower region of the edge filter 6 is especially important. A round inflow orifice 16 can be seen here. Further inflow orifices 16 are located behind and in front of the sectional plane. The inflow orifice 16 may also be configured as a slot extending over the entire edge side. So that the inflow orifice 16 has low flow resistance, it is rounded in the suction region. However, the inflow orifice 16 also extends into the space below the expanded metal. This space is also referred to as a collecting space 22. The collecting space 22 has the advantage that a condensate possibly dripping off from the expanded metal cannot run off downward via the inflow orifice 16. This would be detrimental to hygiene in the cooking area. When condensate collects in the collecting space 22, this condensate can be evaporated again and entrained when the vapor extraction hood is operating with a relatively low occurrence of condensate. Should condensate then still be present here, this can be emptied during the removal of the vortex separator 6, for example for cleaning purposes.

Figure 11:
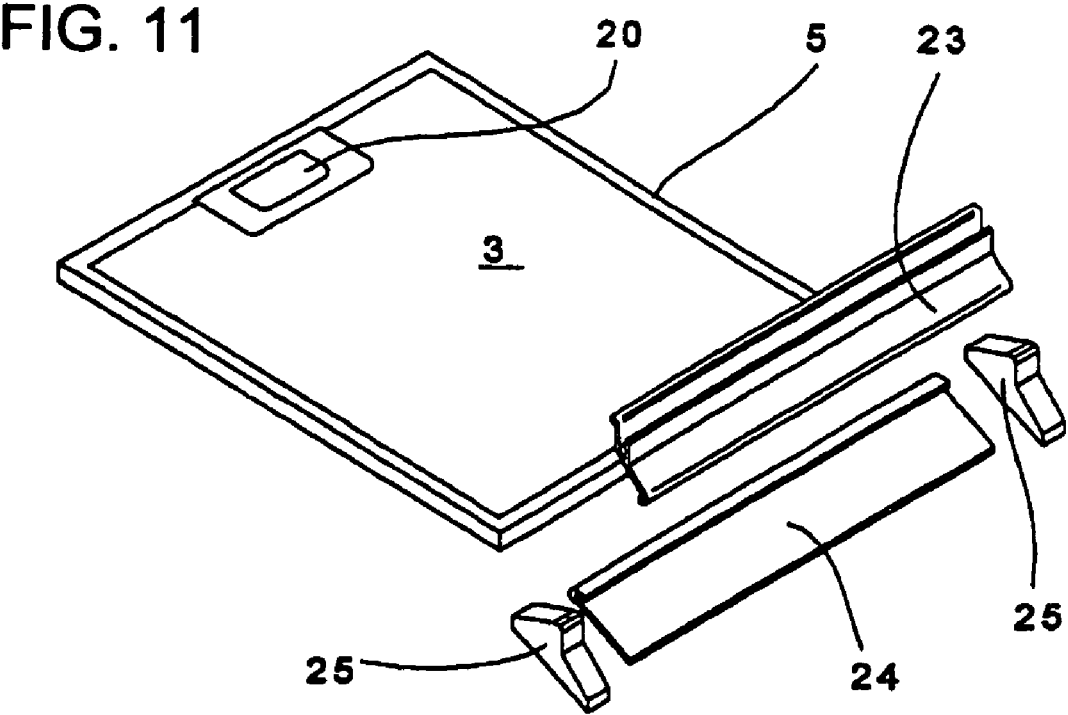
FIG. 11 is a perspective view of a cartridge filter with an edge filter housing having an extruded profile.
Figure 12:
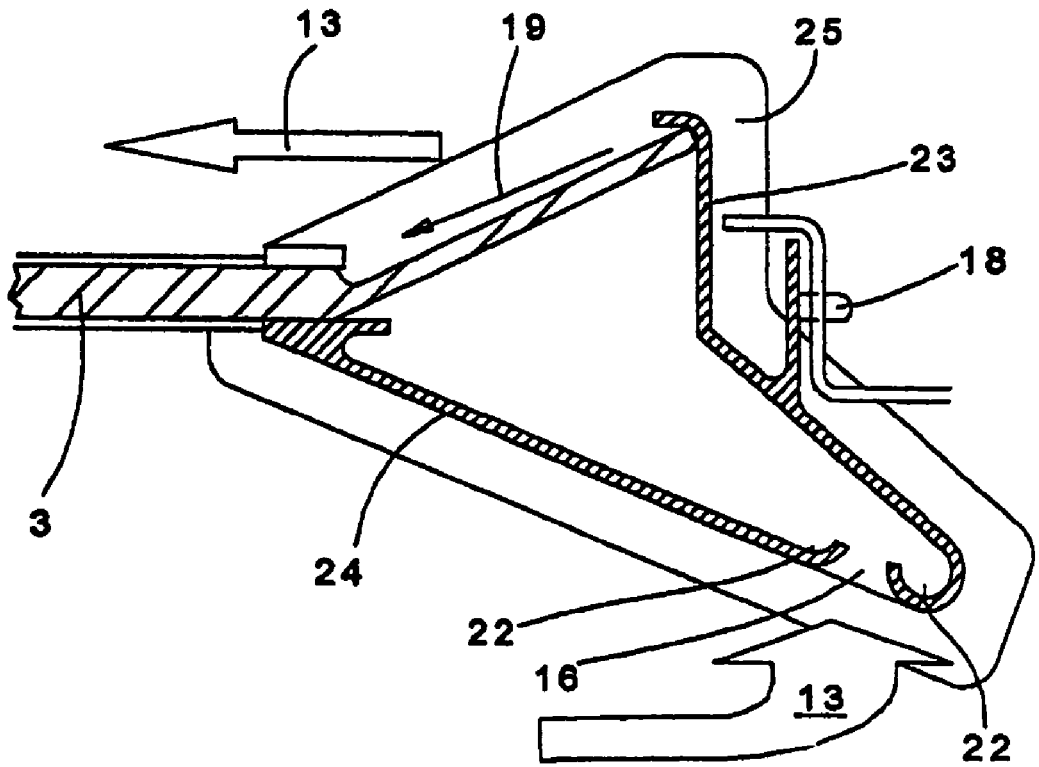
FIG. 12 is a cross-sectional view of the cartridge filter shown in FIG. 11 (mounted state)

In FIGS. 11 and 12, the edge filter 6 is received by two extruded longitudinal parts. An upper part 23, a lower part 24 and two flaps 25 form a housing for the edge filter 6 which, as in FIG. 10, is configured as a prolonged thin-ply expanded-metal filter of the filter ply 3. A perspective exploded drawing can be seen in this respect in FIG. 11. In the assembled state, the edge filter 6 is held, for example, on the frame 5 of a cartridge filter, even without further fastening measures. So that the flaps 25 can be plugged onto the end faces of the parts 23 and 24, corresponding slots must be present on those sides of the flaps 25 which face the parts 23 and 24. A sufficiently narrow dimensioning of the slots gives rise to good clamping forces, and because of this the edge filter 6 then has high mechanical stability.

An assembled edge filter 6 can be seen in cross section in FIG. 12. The upper part 23, the lower part 24 and the expanded metal of the edge filter 6 form the edge filter 6 configured as an expanded-metal filter. One flap 25 lies behind the sectional plane here. The parts 23 and 24 clamp the filter ply 3 and thus fix the edge filter 6 to the filter ply 3. The inflow orifice 16 is formed by the lower ends of the parts 23 and 24 being brought together. Since the parts 23 and 24 are extrusions, the inflow orifice 16 is slot-shaped here. However, the updrawn lower edges of the parts 23 and 24 not only give rise to a nozzle 15, as already shown in FIG. 10, but also give rise to two collecting spaces 22 for condensate possibly dripping off.

The low part 24 is illustrated as being inclined outward. As a result, fumes building up under the filter ply 3 of the vapor extraction hood 2 are prevented from leaving the suction extraction region of the latter. It is then also advantageous, here, that the inflow orifice 16 faces this build-up region.

Figure 13:
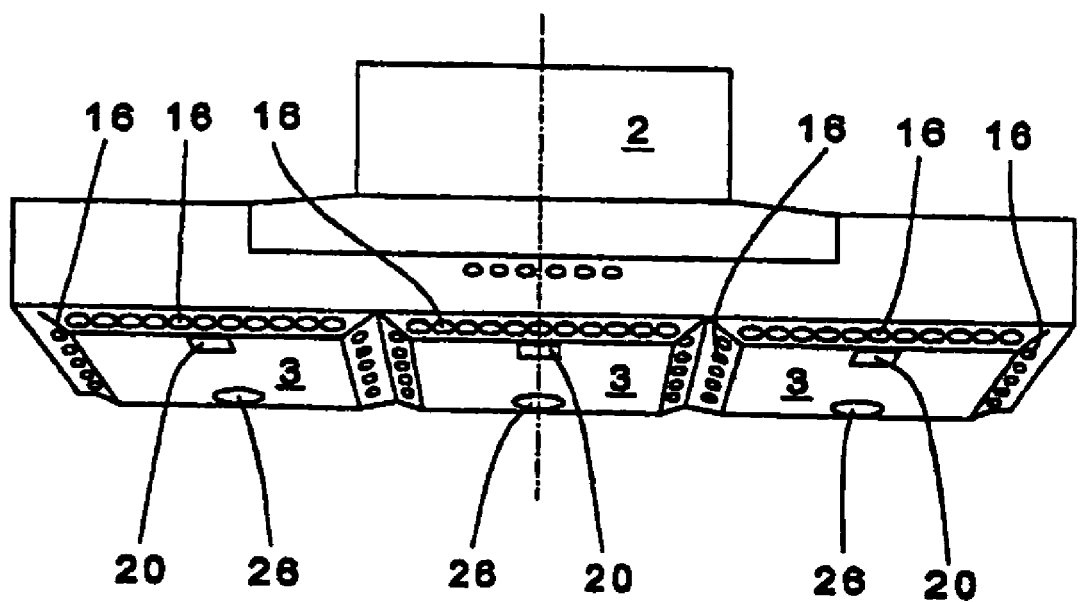
FIG. 13 is a perspective view of a vapor extraction hood with a plurality of filter configurations disposed next to one another.

A vapor extraction hood 2 with three filter elements disposed next to one another and in the form of a pyramid frustum can be seen in FIG. 13. Each of these filter elements is equipped with the filter ply 3 and with edge suction extraction. This edge suction extraction is located at least in part of the lateral slanted regions of the pyramid frustum. At least one ply of expanded metal is disposed downstream of the inflow orifices 16 and thus forms the edge filter 6. The expanded metal of the edge suction preferably has a lower flow resistance than the expanded metal of the central filter ply 3. Due to the edge suction extraction implemented here, in conjunction with the line-up next to one another, advantageous large-area suction occurs even in the middle region of a vapor extraction hood. In the case of a vapor extraction hood with a large suction area, as illustrated in FIG. 13, there is an increased condensate formation. It may then be advantageous, therefore, if an additional collecting gutter for the condensate is present in the vapor extraction hood from the construction shown. Due to the filter configuration being configured in the form of a pyramid frustum, a large filter area is made available.

We claim:

1. A filter configuration for a vapor extraction hood for separating particles and/or liquid droplets from air flowing through the filter configuration, the filter configuration comprising:
    at least one filter ply disposed in one plane, said filter ply has at least one layer formed of at least one material selected from the group consisting of expanded metal, a nonwoven material, and paper; and
    an edge filter disposed in at least one edge region of said filter ply, said edge filter formed as a vortex separator.

2. The filter configuration according to claim 1, wherein said vortex separator is selected from the group consisting of a vortex stream separator and a baffle filter, said vortex separator having at least one row of devices for forming vortices in the air flowing through said edge filter.

3. The filter configuration according to claim 1, wherein said vortex separator is selected from the group consisting of a vortex stream separator and a baffle filter, said vortex separator has two rows of devices disposed one behind the other for forming vortices in the air flowing through the edge filter.

4. The filter configuration according to claim 1, wherein said edge filter is disposed peripherally around said edge region of said filter ply.

5. The filter configuration according to claim 4, wherein said edge filter is disposed on said edge region perpendicularly to a plane of said filter ply, such that separated liquid droplets separated in said edge filter flow into said edge region of said filter ply and are absorbed there.

6. The filter configuration according to claim 1, further comprising a U-shaped frame bordering said filter ply, said U-shaped frame having a lower frame leg and an upper frame leg, said upper frame leg having a prolonged shaped for receiving said edge filter.

7. The filter configuration according to claim 6, wherein said U-shaped frame has, in a region of said edge filter, orifices formed therein for diverting a liquid running off from said edge filter.

8. The filter configuration according to claim 6, wherein said filter ply, together with said edge filter, forms a cartridge filter.

9. The filter configuration according to claim 1, wherein a flow resistance of said edge filter is lower than a flow resistance of said filter ply, and said edge filter allows a higher flow velocity than said filter ply.

10. The filter configuration according to claim 1, further comprising a screen disposed on said edge filter and extending radially outward beyond an edge of said edge filter, for guiding fumes and vapors toward said edge filter.

11. The filter configuration according to claim 1, wherein the filter configuration separates grease and grease droplets and/or water and water droplets from the air flowing through the filter configuration.

12. The filter configuration according to claim 6, wherein said edge filter has a row of X-shaped vortex elements, said X-shaped vortex elements having curved legs engaging one into another so as to maintain an air gap and so that the air flow passes transversely through said X-shaped vortex elements, with a result that vortices are formed there, so that the particles and/or the liquid droplets contained in the air are thrown against a wall of said curve legs and are separated.

13. The filter configuration according to claim 12, wherein:
said filter ply has a cant; and
said curved legs include outer legs and said outer legs in an outer edge region of said edge filter are flush with said cant of said filter ply.

14. The filter configuration according to claim 12, wherein said X-shaped vortex elements are connected to said filter ply and/or to said U-shaped frame.

15. The filter configuration according to claim 2, wherein said vortex separator has a configuration of horizontal curved elements, and inflowing air first impinges onto a streamlined shape of said curved elements and then, in conjunction with at least one further one of said curved elements, experiencing at least one deflection.

16. The filter configuration according to claim 15, wherein said curved elements have a C-shaped configuration.

17. The filter configuration according to claim 15, wherein said curved elements have a V-shaped configuration.

18. The filter configuration according to claim 15, wherein said curved elements have an S-shaped configuration.

19. The filter configuration according to claim 15, wherein said curved elements have a drop-shaped configuration.

20. The filter configuration according to claim 15, wherein said curved elements have a dumbbell-shaped configuration.

21. The filter configuration according to claim 15, wherein said configuration of said curved elements is formed of a combination of said curved elements having two different shapes.

22. The filter configuration according to claim 15, wherein said vortex separator has a common base plate and said curved elements are disposed on said common base plate.

23. The filter configuration according to claim 22, wherein said common base plate extends along at least one edge of said filter ply.

24. The filter configuration according to claim 22, wherein said common base plate is inclined toward said filter ply.

25. The filter configuration according to claim 22, wherein said vortex separator has a further plate disposed above said curved elements and, together with said common base plate, forms a nozzle widening toward said filter ply.

26. The filter configuration according to claim 15, wherein said edge filter is produced by injection molding.

27. The filter configuration according to claim 26, wherein said edge filter is formed from plastic.

28. The filter configuration according to claim 26, wherein said edge filter is formed of metal.

29. The filter configuration according to claim 28, wherein said edge filter is produced from aluminum.

30. The filter configuration according to claim 15, further comprising a U-shaped frame bordering said filter ply, and said edge filter is part of said U-shaped frame.

31. The filter configuration according to claim 15, wherein said edge filter is part of the vapor extraction hood.

32. The filter configuration according to claim 15, further comprising a longitudinally running collecting duct having a downwardly directed inflow orifice formed therein associated with said edge filter.

33. The filter configuration according to claim 15, wherein said edge filter has a swing-out design.

34. The filter configuration according to claim 15, wherein said edge filter has a closing device selected from the group consisting of a slide and a flap and is connectable and disconnectable via said closing device.

35. The filter configuration according to claim 34, wherein the connectability and disconnectability of said closing device takes place manually.

36. The filter configuration according to claim 34, wherein the connectability and disconnectability takes place automatically.

37. The filter configuration according to claim 36, further comprising a sensor configuration for controlling the automatic connection and disconnection.

38. The filter configuration according to claim 15, wherein said edge filter is configured to be easily demountable.

39. The filter configuration according to claim 1, further comprising at least one collecting space for collecting condensate separated in said edge filter.

40. The filter configuration according to claim 1, wherein the filter configuration is configured as a parallelepiped or as a pyramid frustum with an underside and with four edge sides, said filter ply being provided on said underside and said edge filter being provided on at least one of said edge sides.

41. The filter configuration according to claim 6, wherein said filter ply, together with said edge filter and said U-shaped frame, form a cartridge filter.

42. The filter configuration according to claim 12, wherein said row of X-shaped vortex elements is two rows of X-shaped vortex elements disposed one behind the other.

43. The filter configuration according to claim 12, wherein said curved legs include outer legs and said outer legs in an outer edge region of said edge filter are flush with said U-shaped frame.

44. The filter configuration according to claim 12, wherein said U-shaped frame has a frame leg and said X-shaped vortex elements is screwed to said frame leg of said U-shaped frame.

45. The filter configuration according to claim 36, wherein said edge filter has a spring-prestressed flap which opens and closes automatically as a function of a pressure difference between an outside of the filter configuration and a vacuum side.

46. The filter configuration according to claim 45, wherein said spring-prestressed flap edge opens and closes automatically as a function of the selected blower stage.

47. The filter configuration according to claim 37, wherein said sensor configuration controls the automatic connection and disconnection in dependence on an air quantity to be purified.

48. A filter configuration for a vapor extraction hood for separating particles and/or liquid droplets from air flowing through the filter configuration, the filter configuration comprising:
    at least one filter ply disposed in one plane; and
    an edge filter disposed in at least one edge region of said filter ply, said edge filter having a lower flow resistance than said filter ply, wherein said edge filter is disposed peripherally around said edge region of said filter ply.

49. The filter configuration according to claim 48, wherein said edge filter is disposed on said edge region perpendicularly to a plane of said filter ply, such that separated liquid droplets separated in said edge filter flow into said edge region of said filter ply and are absorbed there.

50. A filter configuration for a vapor extraction hood for separating particles and/or liquid droplets from air flowing through the filter configuration, the filter configuration comprising:
    at least one filter ply disposed in one plane; and
    an edge filter disposed in at least one edge region of said filter ply, said edge filter having a lower flow resistance than said filter ply, wherein said filter ply has at least one layer formed of at least one material selected from the group consisting of expanded metal, a nonwoven material, and paper.

51. A filter configuration for a vapor extraction hood for separating particles and/or liquid droplets from air flowing through the filter configuration, the filter configuration comprising:
    at least one filter ply disposed in one plane; and
    an edge filter disposed in at least one edge region of said filter ply, said edge filter having a lower flow resistance than said filter ply;
    a U-shaped frame bordering said filter ply, said U-shaped frame having a lower frame leg and an upper frame leg, said upper frame leg having a prolonged shaped for receiving said edge filter, wherein said U-shaped frame has, in a region of said edge filter, orifices formed therein for diverting a liquid running off from said edge filter.

52. A filter configuration for a vapor extraction hood for separating particles and/or liquid droplets from air flowing through the filter configuration, the filter configuration comprising:
    at least one filter ply disposed in one plane; and
    an edge filter disposed in at least one edge region of said filter ply, said edge filter having a lower flow resistance than said filter ply, further comprising a screen disposed on said edge filter and extending radially outward beyond an edge of said edge filter, for guiding fumes and vapors toward said edge filter.

53. A filter configuration for a vapor extraction hood for separating particles and/or liquid droplets from air flowing through the filter configuration, the filter configuration comprising:
    at least one filter ply disposed in one plane; and
    an edge filter disposed in at least one edge region of said filter ply, said edge filter having a lower flow resistance than said filter ply, wherein the filter configuration separates grease and grease droplets and/or water and water droplets from the air flowing through the filter configuration.

54. A filter configuration for a vapor extraction hood for separating particles and/or liquid droplets from air flowing through the filter configuration, the filter configuration comprising:
    at least one filter ply disposed in one plane; and
    an edge filter disposed in at least one edge region of said fitter ply, said edge filter having a lower flow resistance than said filter ply;
    a U-shaped frame bordering said filter ply, said U-shaped frame having a lower frame leg and an upper frame leg, said upper frame leg having a prolonged shaped for receiving said edge filter, wherein said edge filter has a row of X-shaped vortex elements, said X-shaped vortex elements having curved legs engaging one into another so as to maintain an air gap and so that the air flow passes transversely through said X-shaped vortex elements, with a result that vortices are formed there, so that the particles and/or the liquid droplets contained in the air are thrown against a wall of said curve legs and are separated.

55. The filter configuration according to claim 54, wherein:
    said filter ply has a cant; and
    said curved legs include outer legs and said outer legs in an outer edge region of said edge filter are flush with said cant of said filter ply.

56. The filter configuration according to claim 54, wherein said X-shaped vortex elements are connected to said filter ply and/or to said U-shaped frame.

57. The filter configuration according to claim 54, wherein said row of X-shaped vortex elements is two rows of X-shaped vortex elements disposed one behind the other.

58. The filter configuration according to claim 54, wherein said curved legs include outer legs and said outer legs in an outer edge region of said edge filter are flush with said U-shaped frame.

59. The filter configuration according to claim 54, wherein said U-shaped frame has a frame leg and said X-shaped vortex elements is screwed to said frame leg of said U-shaped frame.

60. A filter configuration for a vapor extraction hood for separating particles and/or liquid droplets from air flowing through the filter configuration, the filter configuration comprising:
    at least one filter ply disposed in one plane; and
    an edge filter disposed in at least one edge region of said filter ply, said edge filter having a lower flow resistance than said filter ply, wherein said edge filter is a vortex separator selected from the group consisting of a vortex stream separator and a baffle filter, said vortex separator having at least one row of devices for forming vortices in the air flowing through said edge filter and wherein said vortex separator has a configuration of horizontal curved elements, and inflowing air first impinges onto a streamlined shape of said curved elements and then, in conjunction with at least one further one of said curved elements, experiencing at least one deflection.

61. The filter configuration according to claim 60, wherein said curved elements have a C-shaped configuration.

62. The filter configuration according to claim 60, wherein said curved elements have a V-shaped configuration.

63. The filter configuration according to claim 60, wherein said curved elements have an S-shaped configuration.

64. The filter configuration according to claim 60, wherein said curved elements have a drop-shaped configuration.

65. The filter configuration according to claim 60, wherein said curved elements have a dumbbell-shaped configuration.

66. The filter configuration according to claim 60, wherein said configuration of said curved elements is formed of a combination of said curved elements having two different shapes.

67. The filter configuration according to claim 60, wherein said vortex separator has a common base plate and said curved elements are disposed on said common base plate.

68. The filter configuration according to claim 67, wherein said common base plate extends along at least one edge of said filter ply.

69. The filter configuration according to claim 67, wherein said common base plate is inclined toward said filter ply.

70. The filter configuration according to claim 67, wherein said vortex separator has a further plate disposed above said curved elements and, together with said common base plate, forms a nozzle widening toward said filter ply.

71. The filter configuration according to claim 60, wherein said edge filter is produced by injection molding.

72. The filter configuration according to claim 71, wherein said edge filter is formed from plastic.

73. The filter configuration according to claim 71, wherein said edge filter is formed of metal.

74. The filter configuration according to claim 73, wherein said edge filter is produced from aluminum.

75. The filter configuration according to claim 60, further comprising a U-shaped frame bordering said filter ply, and said edge filter is part of said U-shaped frame.

76. The filter configuration according to claim 60, wherein said edge filter is part of the vapor extraction hood.

77. The filter configuration according to claim 60, further comprising a longitudinally running collecting duct having a downwardly directed inflow orifice formed therein associated with said edge filter.

78. The filter configuration according to claim 60, wherein said edge filter has a swing-out configuration.

79. The filter configuration according to claim 60, wherein said edge filter has a closing device selected from the group consisting of a slide and a, flap and is connectable and disconnectable via said closing device.

80. The filter configuration according to claim 79, wherein the connectability and disconnectability of said closing device takes place manually.

81. The filter configuration according to claim 79, wherein the connectability and disconnectability takes place automatically.

82. The filter configuration according to claim 79, further comprising a sensor configuration for controlling the automatic connection and disconnection.

83. The filter configuration according to claim 60, wherein said edge filter is configured to be easily demountable.

84. The filter configuration according to claim 81, wherein said edge filter has a spring-prestressed flap which opens and closes automatically as a function of a pressure difference between an outside of the filter configuration and a vacuum side.

85. The filter configuration according to claim 84, wherein said spring-prestressed flap edge opens and closes automatically as a function of the selected blower stage.

86. The filter configuration according to claim 82, wherein said sensor configuration controls the automatic connection and disconnection in dependence on an air quantity to be purified.

* * * * *